UNITED STATES PATENT OFFICE.

ROBERT CUMMING ANNAND, OF LONDON, ENGLAND.

STEREOTYPING.

1,286,490. Specification of Letters Patent. Patented Dec. 3, 1918.

No Drawing. Application filed April 9, 1918. Serial No. 227,474.

*To all whom it may concern:*

Be it known that I, ROBERT CUMMING ANNAND, of London, England, have invented certain new and useful Improvements Relating to Stereotyping, of which the following is a specification.

My invention has reference to a new or improved process and means for producing a mold or matrix of a form or page of type.

The best results obtained up to the present in stereotyping, say a newspaper page, are obtained by employing a flong made of several layers or thicknesses of suitably selected papers, pasted together with a suitable paste, and using this preparation in a damp state to form a mold and drying it on the type, under pressure. The chief objection to this process is that it takes four or more minutes to dry the moisture out of the mold.

The object of my invention is to provide a flong in which the moisture is reduced to its smallest amount, thereby reducing the time required for drying it. With this object in view I make my flong in two parts and use the one part in a damp state and the other in a dry condition, with a dry adhesive in between them. The damp part may consist of one or more of the selected sheets pasted together, when more than one, in the usual way, the object being to make this part of the flong thin and thereby reduce the amount of moisture necessary to keep it in a soft and pliable state. I hereinafter call this part of the flong the facing portion. The dry part, which I hereinafter call the backing portion, is made up of one or more sheets of selected and suitable paper which, when more than one, have been pasted together in the usual or suitable way and thoroughly dried. I introduce or provide between the facing portion and the backing portion a layer, film, or coat of dry mucilage or adhesive, so that when the facing part in a damp state is put together with the dry backing portion on to the form, the damp facing portion and the dry backing portion can be made to adhere together by the moisture, or steam arising from the damp facing part dissolving or rendering tacky the adhesive between them when the form is put under the hot press.

The dry adhesive may consist of powdered gum, starch or other similar well-known dry adhesive which may be brushed on to the back of the facing portion, or on to the under side of the backing portion, or it may be a separate sheet or film of the adhesive. Instead of using the adhesive in the form of a dry powder I may face one side of the backing portion with a facing of mucilage or adhesive such, for instance as is used in making gummed papers, postage-stamps, envelops, or such like articles that can be dried and again made adhesive by moistening. The thickness of this backing portion may be made the full thickness, or more or less than the full thickness of an ordinary stereo flong so as to give stiffness to the mold when completed.

In carrying my invention into practice I first place the facing portion of the flong in a damp state on the form of type to be molded and impress it on to the type in the usual way, for instance by a mangle or a brush.

Next I lay the dry part of the flong, preferably in a heated state, on above the damp part while this still remains on the form, putting the gummed side, or side coated or dusted or faced with adhesive or sheet of adhesive, next the damp part. The form with the mold on the top of it (the flong after it has been impressed on to the type is called the mold or matrix or mat) is next slid under the hot press where it is subjected to considerable pressure in the well known way. The damp in the facing part very quickly softens the dry adhesive between the damp facing portion and the dry backing portion of the matrix and causes the two parts to adhere and form one flong. The heated form further drives the moisture out of the facing portion, into and through the backing portion, temporarily softening the backing portion and making it, on account of the pressure of the upper press platen, conform more or less to the inequalities of the face of the type.

The heat of the drying press very quickly dries the whole mold, at the same time hardening it, so that it will stand up firmly to the pressure of the stereo metal type or the like in the plate casting machine.

By means of my invention, a thin facing part can be used to take the mold of the type, so that although it is sufficiently damp and pliable to go well into the type it contains a minimum of moisture that can be rapidly evaporated. The impression of the type having been well forced into the thin and flexible facing part, the backing being used dry, can be made thick and substantial to secure a stiff mold that will stand up to cast a large number of plates.

In this invention I do not confine myself to the selection of any special class of papers, nor to the use of any specific ingredients in the paste which may be used for pasting the different thicknesses of material together in forming the facing or backing portions. The same good results can be obtained from a large variety of stereo papers as supplied by the various makers. The same remark applies to the various stereo pastes and gums obtainable on the market and used for the various purposes specified. A workman skilled in the art of stereotyping is competent to select the various articles required suitable for the special nature of the type to be molded and the stereo plates to be cast.

What I claim and desire to secure by Letters Patent is:—

1. Process for the production of a stereotype matrix, comprising uniting together under pressure on the form, a damp facing portion and a separate dry backing portion of a flong by means of an adhesive interposed dry between said facing and backing portions.

2. Process for the production of a stereotype matrix, comprising uniting together under pressure on the form, a damp facing portion and a separate dry backing portion of a flong by means of an adhesive interposed dry between said facing and backing portions, which adhesive is rendered tacky by the moisture of said damp facing portion.

3. Process for the production of a stereotype matrix, comprising uniting together under heat and pressure on the form, a damp facing portion and separate dry backing portion of a flong by means of an adhesive interposed dry between said facing and backing portions.

4. Process for the production of a stereotype matrix, comprising uniting together under heat and pressure on the form, a damp facing portion and separate dry backing portion of a flong by means of an adhesive interposed dry between said facing and backing portions, which adhesive is rendered tacky by the moisture of said damp facing portion under the effect of said heat.

5. Process for the production of a stereotype matrix, comprising impressing on the form in a damp state a facing portion of a flong, uniting said facing portion under pressure on the form, to a separate dry backing portion of the flong by means of an adhesive interposed dry between said facing and backing portions, which adhesive is rendered tacky by the moisture of the damp facing portion, and drying the resulting compound matrix.

6. Process for the production of a stereotype matrix, comprising taking an impression of the form on a damp facing portion of a flong, applying on the back of said impressed facing portion while on the form, a separate dry backing portion of the flong, and uniting said facing and backing portions together under pressure on the form by adhesive interposed dry between them.

7. Process for the production of a stereotype matrix, comprising taking an impression of the form on a damp facing portion of a flong, applying on the back of said impressed facing portion while on the form, a separate dry backing portion of the flong, with provision of a dry adhesive between said facing and backing portions, and uniting said facing and backing portions together under pressure on the form of said adhesive rendered tacky by the moisture of the damp facing portion.

8. Process for the production of a stereotype matrix, comprising taking an impression of the form on a damp facing portion of a flong, applying on the back of said impressed facing portion while on the form, a separate dry backing portion of the flong, with provision of a dry adhesive between said facing and backing portions, and subjecting said facing and backing portions to heat and pressure while on the form, whereby the adhesive is rendered tacky by the moisture of the damp facing portion under the effect of the heat, united to the facing portion, and the resulting compound matrix dried on the form by the heat, substantially as described.

9. Process for the production of a stereotype matrix, comprising taking an impression of the form on a damp facing portion of a flong, applying on the back of said impressed facing portion while on the form, a separate dry backing portion of the flong, faced with a dry adhesive layer, and subjecting said facing and backing portions and interposed adhesive layer to heat and pressure while on the form, whereby the adhesive layer is rendered tacky by the moisture of the damp facing portion under the effect of the heat, united to the facing portion and the resulting compound matrix dried on the form by the heat, substantially as described.

10. For the production of a stereotype matrix, a flong comprising a separate facing portion for receiving a mold impression of a form, a separate backing portion, and an intermediate dry adhesive layer for uniting said facing and backing portions, substantially as and for the purpose set forth.

In witness whereof, I have hereunto signed my name.

ROBERT CUMMING ANNAND.

Copies of this patent may be obtained for five cents each, by addressing the "Commissioner of Patents, Washington, D. C."